(12) United States Patent
Seo et al.

(10) Patent No.: US 10,899,065 B2
(45) Date of Patent: Jan. 26, 2021

(54) APPARATUS AND METHOD FOR MANUFACTURING DISPLAY APPARATUS

(71) Applicant: Samsung Display Co., Ltd., Yongin-si (KR)

(72) Inventors: Youngseok Seo, Yongin-si (KR); Cheolyun Jeong, Yongin-si (KR); Mugyeom Kim, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 425 days.

(21) Appl. No.: 15/261,183

(22) Filed: Sep. 9, 2016

(65) Prior Publication Data
US 2017/0113397 A1 Apr. 27, 2017

(30) Foreign Application Priority Data
Oct. 26, 2015 (KR) .................. 10-2015-0148820

(51) Int. Cl.
| | |
|---|---|
| *B29C 51/08* | (2006.01) |
| *B29C 51/10* | (2006.01) |
| *B29C 51/36* | (2006.01) |
| *B29C 51/46* | (2006.01) |
| B29L 31/34 | (2006.01) |
| B29C 51/12 | (2006.01) |
| B29C 65/78 | (2006.01) |

(52) U.S. Cl.
CPC ............ *B29C 51/087* (2013.01); *B29C 51/10* (2013.01); *B29C 51/36* (2013.01); *B29C 51/46* (2013.01); *B29C 51/12* (2013.01); *B29C 65/785* (2013.01); *B29C 65/7841* (2013.01); *B29L 2031/3475* (2013.01)

(58) Field of Classification Search
CPC .......... B32B 2037/1081; B32B 2457/20–208; B29C 66/81455; B29C 66/81457; B29C 66/81459; B29C 33/16; B29C 51/12; B29C 65/7841; B29C 65/785; B30B 5/02
See application file for complete search history.

(56) References Cited

U.S. PATENT DOCUMENTS

| | | | |
|---|---|---|---|
| 8,878,116 | B2 | 11/2014 | Itonaga |
| 2005/0236101 | A1 | 10/2005 | Kobayashi |

(Continued)

FOREIGN PATENT DOCUMENTS

| | | | |
|---|---|---|---|
| CN | 1691848 | A | 11/2005 |
| CN | 101910448 | A | 12/2010 |

(Continued)

*Primary Examiner* — Matthew J Daniels
*Assistant Examiner* — Andrew L Swanson
(74) *Attorney, Agent, or Firm* — Lewis Roca Rothgerber Christie LLP

(57) ABSTRACT

An apparatus for manufacturing a display apparatus includes: a first mold configured to accommodate a cover member thereon; a magnetic first guide in the first mold; a second mold arranged to face the first mold; and a magnetic shape-variable unit in the second mold. The shape-variable unit is configured to come into contact with and move a panel member toward the cover member, and a first portion of the panel member is configured to contact the cover member before a second portion of the panel member contacts the cover member due to a magnetic force between the shape-variable unit and the first guide.

9 Claims, 10 Drawing Sheets

(56) References Cited

U.S. PATENT DOCUMENTS

| | | | |
|---|---|---|---|
| 2011/0048323 A1 | 3/2011 | Kondo et al. | |
| 2014/0002973 A1* | 1/2014 | Lee | H05K 5/03 361/679.01 |
| 2017/0021534 A1* | 1/2017 | Chapman | B29C 43/10 |

FOREIGN PATENT DOCUMENTS

| | | | | |
|---|---|---|---|---|
| CN | 102651382 A | | 8/2012 | |
| JP | 7-125071 A | | 5/1995 | |
| JP | 2010-49048 A | | 3/2010 | |
| JP | 2012-111075 A | | 6/2012 | |
| KR | 20130057363 A | * | 5/2013 | B32B 37/10 |
| KR | 10-1337549 B1 | | 12/2013 | |
| KR | 10-2014-0002491 A | | 1/2014 | |
| KR | 10-2015-0059566 A | | 6/2015 | |
| WO | WO 96/39294 A1 | | 12/1996 | |

* cited by examiner

APPARATUS AND METHOD FOR MANUFACTURING DISPLAY APPARATUS

CROSS-REFERENCE TO RELATED APPLICATION

This application claims priority to and the benefit of Korean Patent Application No. 10-2015-0148820, filed on Oct. 26, 2015 in the Korean Intellectual Property Office, the disclosure of which is incorporated herein in its entirety by reference.

BACKGROUND

1. Field

One or more embodiments relate to an apparatus and method for manufacturing a display apparatus.

2. Description of the Related Art

Mobile electronic devices have come into widespread use. Recently, tablet personal computers (PCs) and mobile phones have been widely used as mobile electronic devices.

In order to support various functions, such mobile electronic devices include a display device for providing a user with visual information, such as an image or video. Recently, as components for driving such display devices have become smaller, the importance of a display device in an electronic device has increased. Also, display devices that can be bent at an angle have been developed.

SUMMARY

In the related art, when a panel member is adhered to a cover member having a bent or curved portion, the panel member is adhered to the bent or curved portion before being adhered to remaining portions thereof and is, thus, not adhered to or not adequately adhered to the remaining portions of the cover member. One or more aspects of embodiments are directed toward an apparatus and method for manufacturing a display apparatus capable of rapidly and precisely adhering a panel member and a cover member to each other.

Additional aspects will be set forth, in part, in the description which follows and, in part, will be apparent from the description or may be learned by practice of the presented embodiments.

According to one or more embodiments, an apparatus for manufacturing a display apparatus includes: a first mold configured to accommodate a cover member thereon; a magnetic first guide in the first mold; a second mold arranged to face the first mold; and a magnetic shape-variable unit in the second mold, the shape-variable unit being configured to come into contact with and move a panel member toward the cover member, a first portion of the panel member being configured to contact the cover member before a second portion of the patent member contacts the cover member due to a magnetic force between the shape-variable unit and the first guide.

In one embodiment, one of the first guide and the shape-variable unit may include a magnet, and the other of the first guide and the shape-variable unit may include a magnetic substance.

In one embodiment, the first guide and the shape-variable unit may each include a magnet.

In one embodiment, the first guide may be arranged in the first mold to guide a center portion of the panel member to contact the cover member before outer portions of the panel member contact the cover member.

In one embodiment, the first guide may be at a curved portion or a bent portion of the first mold.

In one embodiment, the apparatus may further include a sensor in the first mold at a position corresponding to the panel member, and the sensor may be configured to sense a location of the panel member.

In one embodiment, the first guide may include a first sub-guide at a position in the first mold corresponding to a portion of the panel member; and a second sub-guide at a position in the first mold corresponding to another portion of the panel member and may be spaced from the first sub-guide.

In one embodiment, an intensity of a magnetic field of the first sub-guide may be different from an intensity of a magnetic field of the second sub-guide.

In one embodiment, a first distance of the first sub-guide in the first mold from an inner surface of the first mold may be different from a second distance of the second sub-guide in the first mold from the inner surface of the first mold.

In one embodiment, the first sub-guide and the second sub-guide may selectively form a magnetic field.

In one embodiment, the shape-variable unit may include a flexible material.

In one embodiment, the shape-variable unit may include a shape-variable body including a flexible material; and a second guide in the shape-variable body, arranged to face the first guide, and configured to be attracted to the first guide by a magnetic force.

In one embodiment, the second guide may be integral with the shape-variable body.

In one embodiment, the second guide may extend over an upper surface of the shape-variable body.

In one embodiment, the first guide may be configured to move along a surface of the cover member.

According to one or more embodiments, a method of manufacturing a display apparatus includes: placing a cover member on a first mold and placing a panel member on a shape-variable unit; changing a shape of the shape-variable unit to adhere a first portion of the panel member to the cover member before second portions of the panel member adhere to the cover member; and further changing the shape of the shape-variable unit to sequentially adhere the panel member to the cover member from the first portion of the panel member to the second portions of the panel member.

In one embodiment, the first portion of the panel member may be moved toward the cover member due to a magnetic force.

In one embodiment, the second portions of the panel member may be restricted from moving toward the cover member due to a repulsive magnetic force.

In one embodiment, an intensity of a magnetic field at the first portion of the panel member may be different from an intensity of a magnetic force at the second portions of the panel member.

In one embodiment, the method may further include sensing a distance between the first portion of the panel member and the cover member.

Additional aspects and characteristics of embodiments will be apparent from the drawings, claims, and detailed descriptions set forth herein.

Such aspects of the inventive concept may be accomplished using a system, a method, a computer program, or a combination thereof.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
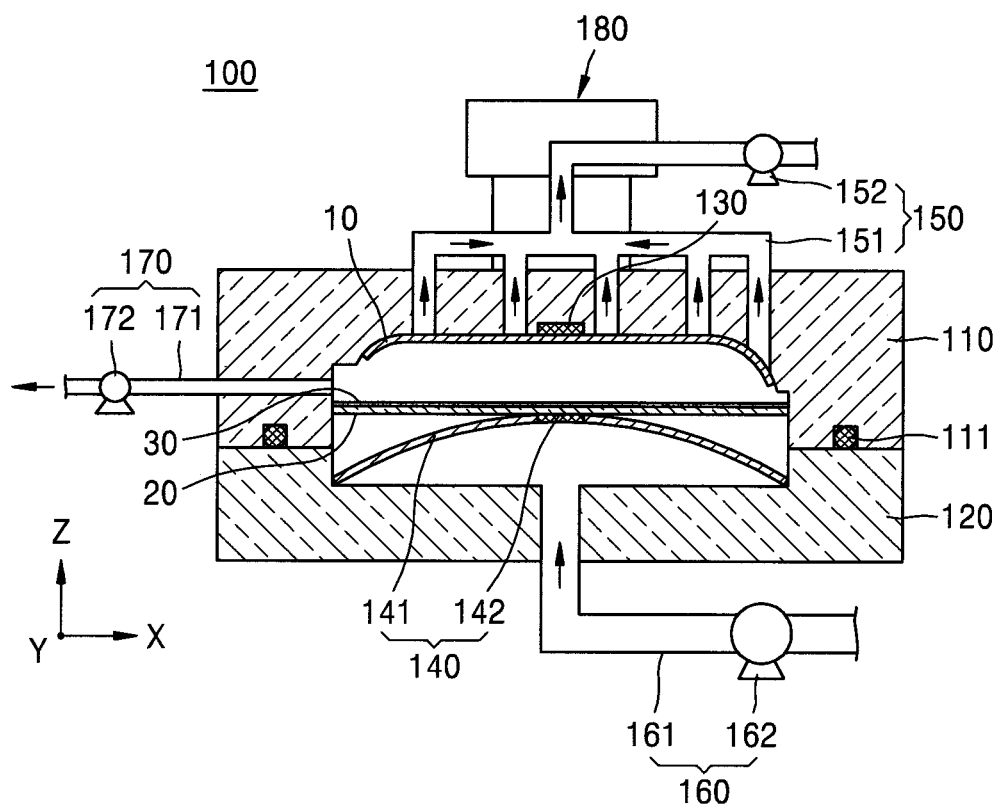
FIG. 1 is a cross-sectional view of an apparatus for manufacturing a display apparatus according to a first embodiment.

The inventive concept may be embodied in many different forms and accomplished in various embodiments. Thus, exemplary embodiments are illustrated in the drawings and described in detail herein. The aspects and features of the inventive concept and methods of accomplishing them will be apparent from the following embodiments in conjunction with the appended drawings. However, the inventive concept is not limited to the following embodiments and changes may be made in these embodiments without departing from the spirit and scope of the inventive concept.

Hereinafter, exemplary embodiments will be described in detail with reference to the accompanying drawings. In the drawings, the same reference numerals are assigned to the same or corresponding elements and may not be redundantly described.

It will be understood that although the terms "first," "second," etc. may be used herein to describe various components, these components should not be limited by these terms. These terms are only used to distinguish one component from another.

As used herein, the singular forms "a" and "an" are intended to include the plural forms as well, unless the context clearly indicates otherwise.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

It will be further understood that the terms "include," "including," "comprise," and/or "comprising" used herein specify the presence of the stated feature(s) or component(s) but do not preclude the presence or addition of one or more other feature(s) or component(s).

It will be understood that when a layer, region, or component is referred to as being "on" or "formed on" another layer, region, or component, it can be directly or indirectly on or formed on the other layer, region, or component. That is, for example, intervening layers, regions, or components may be present.

It will be understood that when an element or layer is referred to as being "connected to" or "coupled to" another element or layer, it may be directly connected or coupled to the other element or layer or one or more intervening elements or layers may also be present. When an element is referred to as being "directly on," "directly connected to," or "directly coupled to" another element or layer, there are no intervening elements or layers present.

Sizes of elements in the drawings may be exaggerated for convenience of explanation. In other words, because sizes and thicknesses of components in the drawings may be arbitrarily illustrated for convenience of explanation, the following embodiments are not limited thereto.

In the following examples, the x-axis, the y-axis and the z-axis are not limited to three axes of a rectangular coordinate system and may be interpreted in a broader sense. For example, the x-axis, the y-axis, and the z-axis may be perpendicular to one another or may represent different directions that are not perpendicular to one another.

When a certain embodiment may be implemented differently, a specific process order may be performed differently from the described order. For example, two consecutively described processes may be performed concurrently or at substantially the same time or may be performed in an order opposite to the described order.

As used herein, the term "and/or" includes any and all combinations of one or more of the associated listed items. Expressions, such as "at least one of," when preceding a list of elements, modify the entire list of elements and do not modify the individual elements of the list. Further, the use of "may" when describing embodiments of the present invention relates to "one or more embodiments of the present invention." Also, the term "exemplary" is intended to refer to an example or illustration. As used herein, the terms "use," "using," and "used" may be considered synonymous with the terms "utilize," "utilizing," and "utilized," respectively.

The apparatus and/or any other relevant devices or components thereof according to embodiments of the present invention described herein may be implemented utilizing any suitable hardware, firmware (e.g., an application-specific integrated circuit), software, and/or a suitable combination of software, firmware, and hardware. For example, the various components may be formed on one integrated circuit (IC) chip or on separate IC chips. Further, the various components may be implemented on a flexible printed circuit film, a tape carrier package (TCP), a printed circuit board (PCB). Further, the various components may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Figure 2:
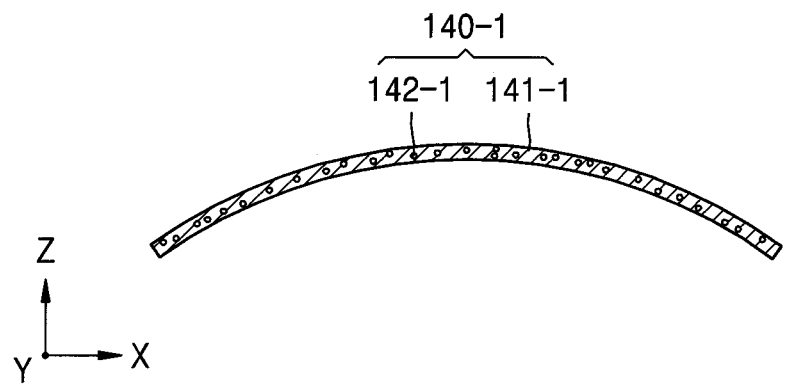
FIG. 2 is a cross-sectional view of a shape-variable unit, such as that shown in FIG. 1, according to another embodiment.

FIG. 1 is a cross-sectional view of an apparatus for manufacturing a display apparatus according to an embodiment. FIG. 2 is a cross-sectional view of a shape-variable unit, such as that shown in FIG. 1, according to another embodiment.

Referring to FIGS. 1 and 2, an apparatus 100 for manufacturing a display apparatus may include a first mold 110, a second mold 120, a first guide unit 130 (e.g., a first guide), a shape-variable unit 140 (e.g., a flexible seal or flexible membrane), a cover member fixing unit 150 (e.g., a cover member holder), a pressure adjusting unit 160 (e.g., a pump), a sucking unit 170 (e.g., a vacuum), and a mold driving unit 180 (e.g., a mold driver).

A cover member 10 may be provided on or in the first mold 110. The cover member 10 may include a cover window. The cover window may include glass, plastic or the like. The first mold 110 may include a metal material, a synthetic resin material, or the like. One surface of the first mold 110 may correspond to one surface (a side) of the cover member 10. For example, when one portion of the cover member 10 is flat and another portion thereof is curved, one portion of the one surface (the side) of the first mold 110 may be formed to be flat and another portion of the one surface (the same side) of the first mold 110 may be formed to be curved.

The second mold 120 may include a material that is substantially the same as the material of the first mold 110 described above. The second mold 120 may be selectively combined with or separated from the first mold 110. At least one of the first mold 110 and the second mold 120 may be connected to the mold driving unit 180. In one embodiment, the mold driving unit 180 may move at least one of the first mold 110 and the second mold 120 to combine the first mold 110 and the second mold 120 with each other or to separate the first mold 110 and the second mold 120 from each other. A sealing unit 111 (e.g., a sealant or gasket) may be provided between the first mold 110 and the second mold 120 to separate or seal, from the outside, a space (e.g., an inner space) formed when the first mold 110 and the second mold 120 are combined with each other by the sealing unit 111. The sealing unit 111 may have a general ring shape but examples thereof may include various devices and structures having a sealing function. For convenience of explanation, an embodiment in which the first mold 110 is connected to the mold driving unit 180 will be described in further detail below.

The first guide unit 130 may be provided in or on the first mold 110. The first guide unit 130 may be formed in various shapes and may include various components. For example, according to an embodiment, the first guide unit 130 may include a magnet. For example, the first guide unit 130 may include a permanent magnet, an electromagnet, or the like. However, the first guide unit 130 is not limited thereto and may include various devices and structures for forming a magnetic field. According to another embodiment, the first guide unit 130 may include a magnetic substance (e.g., a magnetic material). For example, the first guide unit 130 may include a material, such as a metal. However, the first guide unit 130 is not limited thereto and may include various magnetic substances generating an attractive force or a repulsive force due to a magnetic force. For convenience of explanation, an embodiment in which the first guide unit 130 includes a permanent magnet will be described in further detail below.

The first guide unit 130 may be provided at various locations on the first mold 110. For example, the first guide unit 130 may be provided in the first mold 110 to correspond to a location of the cover member 10 to which a panel member 20 (e.g., a panel) is to be first coupled or adhered. For example, the first guide unit 130 may be provided on a portion of the first mold 110 corresponding to (e.g., above or over) a flat portion of the cover member 10.

The first guide unit 130 may be arranged in (e.g., may extend in) a straight line in the first mold 110. For example, the first guide unit 130 may be formed to extend in a Y-axis direction of FIG. 1.

The shape-variable unit 140 may be formed in various shapes and may include various, suitable materials. For example, according to an embodiment, the shape-variable unit 140 may include a shape-variable body portion 141 (e.g., a shape-variable body) and a second guide unit 142 (e.g., a second guide) as illustrated in FIG. 1. The shape-variable body portion 141 may include a flexible material, such as rubber, silicon, synthetic resin, or the like. For example, the shape-variable body portion 141 may include a flexible and elastic material. The second guide unit 142 may be formed in various shapes and may include various, suitable materials. For example, the second guide unit 142 may include a magnet or a magnetic substance. The second guide unit 142 may be formed to be substantially the same as the first guide unit 130 described above and thus, may not be described again in detail here. For convenience of explanation, an embodiment in which the second guide unit 142 includes a magnetic substance will be described in further detail below.

According to another embodiment, the shape-variable unit 140 may include a flexible magnetic substance. In this embodiment, the shape-variable unit 140 may include a thin film.

According to another embodiment, as illustrated in FIG. 2, the shape-variable body portion 141 of the shape-variable unit 140 may include a magnetic substance or magnetized particles. In this embodiment, during manufacture of the shape-variable body portion 141, the magnetic substance or the magnetized particles may be provided in the form of powder and mixed with the material of the shape-variable body portion 141 to be included in (e.g., dispersed throughout) the shape-variable body portion 141.

According to another embodiment, the shape-variable unit 140 may include the shape-variable body portion 141 and the second guide unit 142. In this embodiment, the shape-variable body portion 141 and the second guide unit 142 may be stacked together (e.g., may be in a stacked arrangement). For convenience of explanation, an embodiment in which the shape-variable body portion 141 is formed as one portion of the shape-variable unit 140 and the second guide unit 142 is formed as another portion of the shape-variable unit 140 will be described in further detail below.

The second guide unit 142 formed as described above may be provided at a location corresponding to the first guide unit 130. For example, the second guide unit 142 may be provided at (e.g., under or below) a portion of the flat portion of the cover member 10.

The cover member fixing unit 150 may adhere the cover member 10 to the first mold 110 (e.g., may hold the cover member 10 in the first mold 110). The cover member fixing unit 150 may be formed in various shapes and may include various components. For example, according to an embodiment, the cover member fixing unit 150 may include a physical sticky chuck or an electrostatic chuck. According to another embodiment, the cover member fixing unit 150 may have a structure, such as a projection, a clamp, etc., formed on the first mold 110. According to another embodiment, the cover member fixing unit 150 may include a first pump 152 and a first guide channel 151. The first guide channel 151 may pass through the first mold 110 and communicate with the interior of the first mold 110 through an opening (e.g., a hole) in an inner surface of the first mold 110 on which the cover member 10 is placed. For example, the cover member 10 may be placed on (e.g., secured to) the first mold 110 by adjusting an internal pressure in the first guide channel 151 to be less than the pressure in the space between the first and second molds 110 and 120 by the first pump 152. For convenience of explanation, an embodiment in which the cover member fixing unit 150 includes the first pump 152 and the first guide channel 151 will be described in further detail below.

The pressure adjusting unit 160 may be connected to the inside of the second mold 120 and may be configured to supply gas or liquid into a space between the second mold 120 and the shape-variable unit 140 so as to change the shape of the shape-variable unit 140. In this embodiment, the pressure adjusting unit 160 may include a supply channel 161 connected to the inside of (e.g., in fluid communication with an inner surface of) the second mold 120 and a pressure adjusting pump 162 provided along the supply channel 161.

The sucking unit 170 may discharge gas from a space between the panel member 20 and the cover member 10 to the outside (e.g., to outside of the first and second molds 110 and 120). The sucking unit 170 may include a second guide channel 171 formed to pass through at least one of the first mold 110 and the second mold 120 and a second pump 172 provided along the second guide channel 171.

The mold driving unit 180 may move at least one of the first mold 110 and the second mold 120. For example, according to this embodiment, the mold driving unit 180 may rotate at least one of the first mold 110 and the second mold 120. The first mold 110 and the second mold 120 may be connected to each other such that they are rotatable about each other. The mold driving unit 180 may be provided at a connection between the first mold 110 and the second mold 120. In this embodiment, the mold driving unit 180 may include a motor connected to at least one of the first mold 110 and the second mold 120.

According to another embodiment, the mold driving unit 180 may drive at least one of the first mold 110 and the second mold 120 in a linear direction. According to this embodiment, the mold driving unit 180 may include a cylinder connected to at least one of the first mold 110 and the second mold 120. Also, according to another embodiment, the mold driving unit 180 may include a linear motor connected to at least one of the first mold 110 and the second mold 120. Also, according to an embodiment, the mold driving unit 180 may include a rack gear connected to at least one of the first mold 110 and the second mold 120, a pinion gear meshed with the rack gear, and a motor connected to the pinion gear. However, the mold driving unit 180 is not limited thereto and may include various devices and structures for linearly moving at least one of the first mold 110 and the second mold 120.

For convenience of explanation, an embodiment in which the mold driving unit 180 includes a cylinder connected to the first mold 110 so as to linearly move the first mold 110 will be described in further detail below.

A method of manufacturing a display apparatus, performed by the apparatus 100 for manufacturing a display apparatus, will now be further described. First, the first mold 110 and the second mold 120 may be separated from each other, and the cover member 10 and the panel member 20 may be loaded into a space between the first mold 110 and the second mold 120. In this embodiment, the cover member 10 and the panel member 20 may be moved by using one or more robot arms, shuttles, or the like, which are additionally provided outside the apparatus 100.

When the cover member 10 is placed on the first mold 110, the first pump 152 may be operated to suck or remove gas from the inside of the first guide channel 151 so as to fix the cover member 10 onto the first mold 110. The panel member 20 may be placed on the shape-variable unit 140.

An adhesive member 30 (e.g., an adhesive) may be provided on at least one of the cover member 10 and the panel member 20 before or after the cover member 10 and the panel member 20 are arranged in the first and second molds 110 and 120. For convenience of explanation, an embodiment in which the adhesive member 30 is provided on the panel member 20 outside the first mold 110 and the second mold 120 will be described in further detail below.

After the arrangement of the panel member 20 and the cover member 10 in the first and second molds 110 and 120 is completed as described above, the mold driving unit 180 may be operated to linearly move the first mold 110 toward the second mold 120 (in a Z-axis direction of FIG. 2). When the first mold 110 and the second mold 120 are completely coupled with each other, a coupling surface between the first mold 110 and the second mold 120 may be sealed by the sealing unit 111.

Also, the pressure adjusting pump 162 may be operated to supply gas or liquid into a space between the second mold 120 and the shape-variable unit 140 via the supply channel 161. In this embodiment, the shape of the shape-variable unit 140 may change to swell toward the cover member 10.

According to the related art, an end or some of a curved portion of the cover member 10 may be adhered to the panel member 20 before other portions of the cover member 10 are adhered to the panel member 20. For example, when both curved ends of the cover member 10 are first adhered to the panel member 20, gas may be confined in the space between the cover member 10 and the panel member 20. When this occurs, the cover member 10 and the panel member 20 may not be completely adhered to each other and air bubbles may form between the cover member 10 and the panel member 20, thereby causing a malfunction or defect in a display apparatus to occur.

However, in the present embodiment, the first guide unit 130 and the second guide unit 142 may guide a portion of the panel member 20 to be moved and adhered to the cover member 10 before other portions of the panel member 20 are adhered to the cover member 10. In this embodiment, the portion of the panel member 20 that is first adhered to the cover member 10 may be located between both ends of the cover member 10 rather than at the ends of the cover member 10. For example, the first guide unit 130 may cause the panel member 20 to be adhered to a flat portion of the cover member 10 before it is adhered to the ends of the cover member 10. In more detail, when the shape of the shape-variable unit 140 changes, a magnetic force may be applied to the second guide unit 142 by a magnetic field of the first guide unit 130. In this embodiment, an attractive force is generated between the first guide unit 130 and the second guide unit 142. Thus, when a distance between the cover member 10 and the panel member 20 is reduced to a certain distance or less, the shape of the shape-variable unit 140 changes to move the second guide unit 142 toward the first guide unit 130. Thus, the panel member 20 may be adhered to a portion of the cover member 10 corresponding to where the first guide unit 130 is located before the panel member 20 is adhered to other portions of the cover member 10.

When the cover member 10 and the panel member 20 begin to adhere to each other at a position corresponding to the first guide unit 130, the pressure adjusting pump 162 may be operated (e.g., continuously operated) to expand (e.g., continuously expand) the shape-variable unit 140. In this embodiment, the panel member 20 may be sequentially adhered outwardly, from the position at which the cover member 10 and the panel member 20 are first adhered with each other, to ends of the cover member 10.

During the process of adhering the panel member 20 to the cover member 10, the second pump 172 may be operated to discharge gas from a space between the panel member 20 and the cover member 10 to the outside. In this embodiment, the gas present in the space between the panel member 20 and the cover member 10 may move from the space between the cover member 10 and the panel member 20 to the second guide channel 171 as the shape-variable unit 140 expands.

When the adhesion between the panel member 20 and the cover member 10 is completed, the operation of the second pump 172 may be stopped. In this embodiment, the first pump 152 may be operated (e.g., continuously operated) to fix the manufactured display apparatus to the first mold 110. The pressure adjusting pump 162 may suck air from the inside of the supply channel 161 and discharge the air to outside of the first mold 110, thereby changing the shape-variable unit 140 back to an initial state.

The mold driving unit 180 may be operated in a manner opposite to that described above to separate the first mold 110 and the second mold 120 from each other. An external robot arm may unload the manufactured display apparatus from the space between the first mold 110 and the second mold 120 to outside the first and second molds 110 and 120.

Thus, the apparatus 100 for manufacturing a display apparatus may precisely and rapidly adhere the cover member 10 and the panel member 20 to each other.

Also, the apparatus 100 for manufacturing a display apparatus and a method of manufacturing a display apparatus may prevent or reduce the occurrence of air bubbles, foreign substances, etc. being trapped between the cover member 10 and the panel member 20, thereby reducing or minimizing an error rate.

With the apparatus 100 for manufacturing a display apparatus and the method of manufacturing a display apparatus, the panel member 20 may be firmly adhered to the cover member 10 by sequentially adhering the panel member 20 from a flat portion of the cover member 10 outwardly to a curved portion of the cover member 10.

Figure 3:
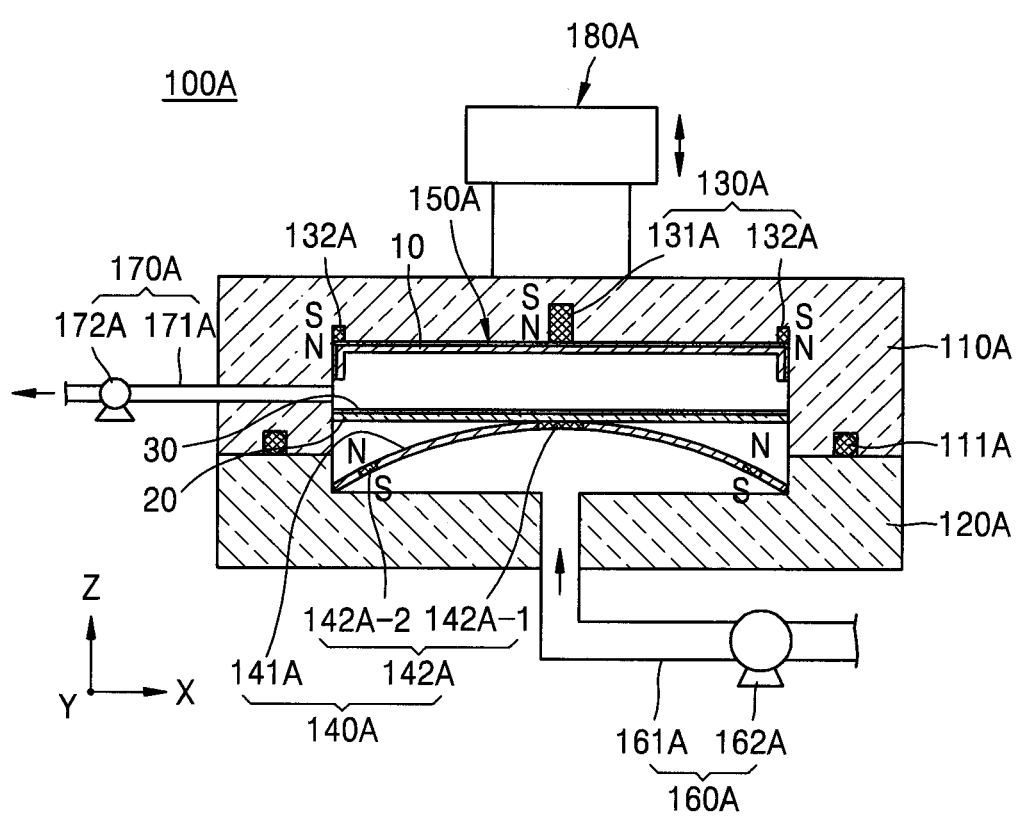
FIG. 3 is a cross-sectional view of an apparatus for manufacturing a display apparatus according to a second embodiment.

FIG. 3 is a cross-sectional view of an apparatus for manufacturing a display apparatus according to a second embodiment.

Referring to FIG. 3, an apparatus 100A for manufacturing a display apparatus may include a first mold 110A, a second mold 120A, a first guide unit 130A, a shape-variable unit 140A, a cover member fixing unit 150A, a pressure adjusting unit 160A, a sucking unit 170A, and a mold driving unit 180A.

The first mold 110A may have a shape corresponding to that of a cover member 10. In this embodiment, a portion of the first mold 110A may be bent. For example, both ends of the first mold 110A may be bent.

The second mold 120A is substantially the same as that described above with reference to FIG. 1 and, thus, may not be described again in detail here.

The first guide unit 130A may include a first sub-guide unit 131A (e.g., a first sub-guide) and a second sub-guide unit 132A (e.g., a second sub-guide). At least one of the first sub-guide unit 131A and the second sub-guide unit 132A may be a magnet or a magnetic substance. For convenience of explanation, an embodiment in which both of the first sub-guide unit 131A and the second sub-guide unit 132A are permanent magnets will be described in further detail below.

The first sub-guide unit 131A and the second sub-guide unit 132A may be provided at various locations on or in the first mold 110A. For example, the first sub-guide unit 131A may be provided at a central portion of the first mold 110A, and the second sub-guide unit 132A may be provided on a bent portion of the first mold 110A. For example, the second sub-guide unit 132A may be provided at a portion of the first mold 110A which begins to bend (e.g., at a portion of the first mold 110A between the central portion and the bent portion), as illustrated in FIG. 3.

In another embodiment, a plurality of second sub-guide units 132A may be provided. In this embodiment, the plurality of second sub-guide units 132A may respectively correspond to bent portions of the first mold 110A. For example, two second sub-guide units 132A may be respectively provided at bent portions of the first mold 110A, as illustrated in FIG. 3.

A surface of the first sub-guide unit 131A and a surface of the second sub-guide units 132A, which face the cover member 10, may have identical polarities. For example, the surface of the first sub-guide unit 131A facing the cover member 10 may be an N-pole, and the surface of the second sub-guide unit 132A facing the cover member 10 may be also an N-pole, as illustrated in FIG. 3.

A magnetic force of the first sub-guide unit 131A may be different from that of the second sub-guide unit 132A. For example, the magnetic force of the first sub-guide unit 131A may be greater than that of the second sub-guide unit 132A.

The shape-variable unit 140A may be formed to be substantially the same as that described above with reference to FIGS. 1 and 2. For convenience of explanation, an embodiment in which the shape-variable unit 140A includes a shape-variable body portion 141A and second guide units 142A will be described in further detail below.

Each of the second guide units 142A may be located between (e.g., integral with) the shape-variable body portions 141A and may be connected to the shape-variable body portion 141A. In this embodiment, the second guide units 142A may include magnets or magnetic substances. For convenience of explanation, an embodiment in which the second guide units 142A are magnets will be described in further detail below.

The second guide units 142A may include a third sub-guide unit 142A-1 and a fourth sub-guide unit 142A-2. The third sub-guide unit 142A-1 may be provided at a location corresponding to the first sub-guide unit 131A. The fourth sub-guide unit 142A-2 may be provided at a location corresponding to the second sub-guide unit 132A.

A surface of the third sub-guide unit 142A-1 and a surface of the fourth sub-guide unit 142A-2, both of which face the cover member 10, may have different polarities. For example, the surface of the third sub-guide unit 142A-1 facing the cover member 10 may be an S-pole, and the surface of the fourth sub-guide unit 142A-2 facing the cover member 10 may be an N-pole, as illustrated in FIG. 3. Thus, a surface of the first sub-guide unit 131A and a surface of the third sub-guide unit 142A-1 that face each other may have different polarities, and a surface of the second sub-guide unit 132A and a surface of the fourth sub-guide unit 142A-2 that face each other may have identical polarities.

The cover member fixing unit 150A may be formed in various shapes and may include various components as described above, but for convenience of explanation, an embodiment in which the cover member fixing unit 150A includes a physical sticky chuck will be described in further detail below.

The pressure adjusting unit 160A may include a supply channel 161A and a pressure adjusting pump 162A. The sucking unit 170A may include a second guide channel 171A and a second pump 172A. The pressure adjusting unit 160A and the sucking unit 170A are substantially the same as those described above with reference to FIGS. 1 and 2 and may not be described again in detail here.

The mold driving unit 180A may be formed in various shapes and may include various components as described above with reference to FIGS. 1 and 2. However, for convenience of explanation, an embodiment in which the mold driving unit 180A includes a cylinder connected to the first mold 110A will be described in further detail below.

An operation of the apparatus 100A for manufacturing a display apparatus will be further described below. After the cover member 10 and the panel member 20 are loaded between the first mold 110A and the second mold 120A, the mold driving unit 180A may be operated to combine the first mold 110A and the second mold 120A with each other.

Also, after the first mold 110A and the second mold 120A are combined with each other, the pressure adjusting pump 162A may be operated to supply gas or fluid into a space between the second mold 120A and the shape-variable unit 140A, thereby expanding the shape-variable unit 140A.

When the shape-variable unit 140A expands as described above, an attractive force may be generated between the first sub-guide unit 131A and the third sub-guide unit 142A-1 and a repulsive force may be generated between the second sub-guide unit 132A and the fourth sub-guide unit 142A-2. In this embodiment, the panel member 20 may not be capable of easily coming close to a portion of the cover member 10 on which the second sub-guide unit 132A is located due to the repulsive force. In contrast, the panel member 20 may be easily adhered to a portion of the cover member 10 on which the first sub-guide unit 131A is located, before it is adhered to the other portions of the cover member 10, due to the attractive force between the first sub-guide unit 131A and the third sub-guide unit 142A-1. For example, because a magnetic force of the first sub-guide unit 131A is stronger than that of the second sub-guide unit 132A, the panel member 20 may be adhered to the portion of the cover member 10 at where the first sub-guide unit 131A is located before it is adhered to the other portions of the cover member 10 at where the second sub-guide unit 132A is located.

The pressure adjusting pump 162A is operated (e.g., continuously operated) after the adhesion of the panel member 20 and the cover member 10 begins as described above, allowing the panel member 20 to be sequentially adhered to both ends of the cover member 10 outwardly from the portion of the cover member 10 at where the first sub-guide unit 131A is located.

In this embodiment, the second pump 172A may be continuously operated to discharge gas from a space between the cover member 10 and the panel member 20 to the outside.

Thus, in the apparatus 100A for manufacturing a display apparatus, a portion of the panel member 20 at where the first sub-guide unit 131A is located may protrude to come close to the cover member 10 and to be first adhered to the cover member 10, and then other portions of the panel member 20 are sequentially adhered to a bent portion of the cover member 10, thereby preventing or reducing the occurrence of foreign substances or air bubbles being stuck between the panel member 20 and the cover member 10.

Also, in the apparatus 100A for manufacturing a display apparatus and a method of manufacturing a display apparatus, the panel member 20 may be sequentially adhered to a flat portion of the cover member 10 and a bent portion thereof, thereby firmly adhering the panel member 20 to the cover member 10.

Figure 4:
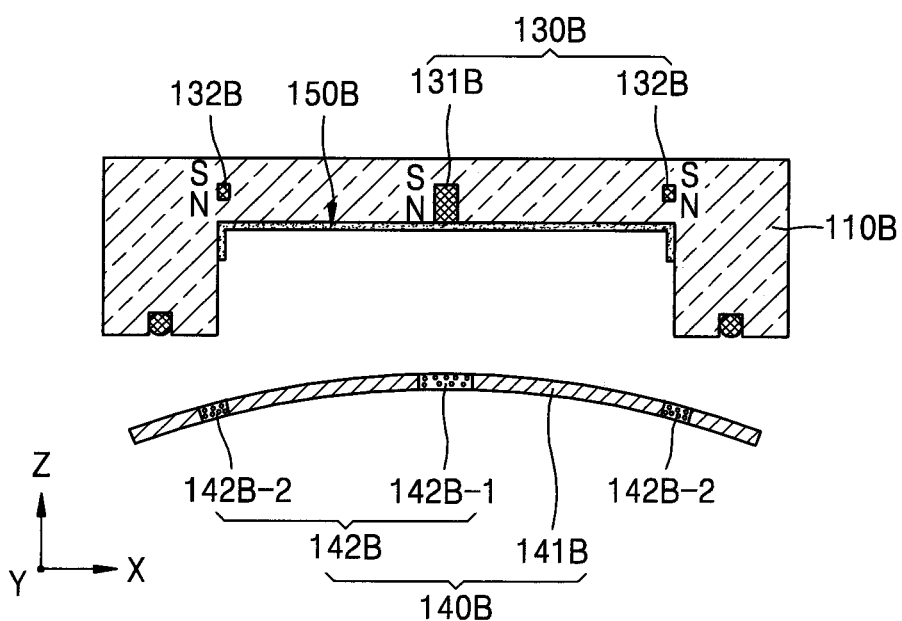
FIG. 4 is a cross-sectional view of a first mold and a first guide unit of an apparatus for manufacturing a display apparatus according to a third embodiment.

FIG. 4 is a cross-sectional view of a first mold and a first guide unit of an apparatus for manufacturing a display apparatus according to a third embodiment.

Referring to FIG. 4, an apparatus 100B for manufacturing a display apparatus may include a first mold 110B, a second mold, a first guide unit 130Ba, a shape-variable unit 140B, a cover member fixing unit 150B, a pressure adjusting unit, a sucking unit, and a mold driving unit. The first mold 110B, the second mold, the cover member fixing unit 150B, the pressure adjusting unit, the sucking unit, and the mold driving unit are substantially the same as those described above with reference to FIG. 3 and, thus, may not be described again in detail here.

The first guide unit 130B may include a first sub-guide unit 131B and a second sub-guide unit 132B. The first sub-guide unit 131B and the second sub-guide unit 132B are substantially the same as those described above and may not be described again in detail here.

The first sub-guide unit 131B and the second sub-guide unit 132B may be provided on the first mold 110B at different heights. For example, a distance between the first sub-guide unit 131B and the cover member 10 may be less than that between the second sub-guide unit 132B and the cover member 10. For example, the first sub-guide unit 131B may be located at a lower location (e.g., closer to the cover member 10) than the second sub-guide unit 132B.

The shape-variable unit 140B may include a shape-variable body portion 141B and a second guide unit 142B. In this embodiment, the shape-variable body portion 141B is substantially the same as that described above and may not be described again in detail here.

The second guide unit 142B may include a third sub-guide unit 140B-1 (e.g., a third sub-guide) and a fourth sub-guide unit 140B-2 (e.g., a fourth sub-guide). The third sub-guide unit 142B-1 and the fourth sub-guide unit 142B-2 may each include a magnetic substance.

The panel member 20 and the cover member 10 may be adhered to each other according to a method that is substantially the same as that described above. For convenience of explanation, an interaction between the first guide unit 130B and the second guide unit 142B will be primarily described in further detail below.

When the shape-variable unit 140B expands to adhere the panel member 20 and the cover member 10 to each other, a distance between the first sub-guide unit 131B and the third sub-guide unit 142B-1 may be less than that between the second sub-guide unit 132B and the fourth sub-guide unit 142B-2. In this embodiment, an attractive force may be generated not only between the first sub-guide unit 131B and the third sub-guide unit 142B-1 but also between the second sub-guide unit 132B and the fourth sub-guide unit 142B-2. However, the attractive force generated between the first sub-guide unit 131B and the third sub-guide unit 142B-1 is greater than that generated between the second sub-guide unit 132B and the fourth sub-guide unit 142B-2. Thus, the panel member 20 and the cover member 10 may be first adhered to each at a location at where the first sub-guide unit 131B is provided.

Then, as the shape-variable unit 140B expands, the panel member 20 may be sequentially adhered to the cover member 10 outwardly to both ends of the cover member 10 from a location at which the panel member 20 and the cover member 10 are first adhered to each other.

Thus, the apparatus 100B for manufacturing a display apparatus is capable of precisely and rapidly adhering the cover member 10 and the panel member 20 to each other.

Also, the apparatus 100B for manufacturing a display apparatus and a method of manufacturing a display apparatus are capable of preventing or reducing the occurrence of air bubbles, foreign substances, etc. being stuck between the cover member 10 and the panel member 20, thereby reducing or minimizing an error rate.

The apparatus 100B for manufacturing a display apparatus and the method of manufacturing a display apparatus are capable of sequentially adhering the panel member 20 to the cover member 10 from a flat portion of the cover member 10 outwardly to a bent portion of the cover member 10. Thus, the panel member 20 may be firmly adhered to the cover member 10.

Figure 5:
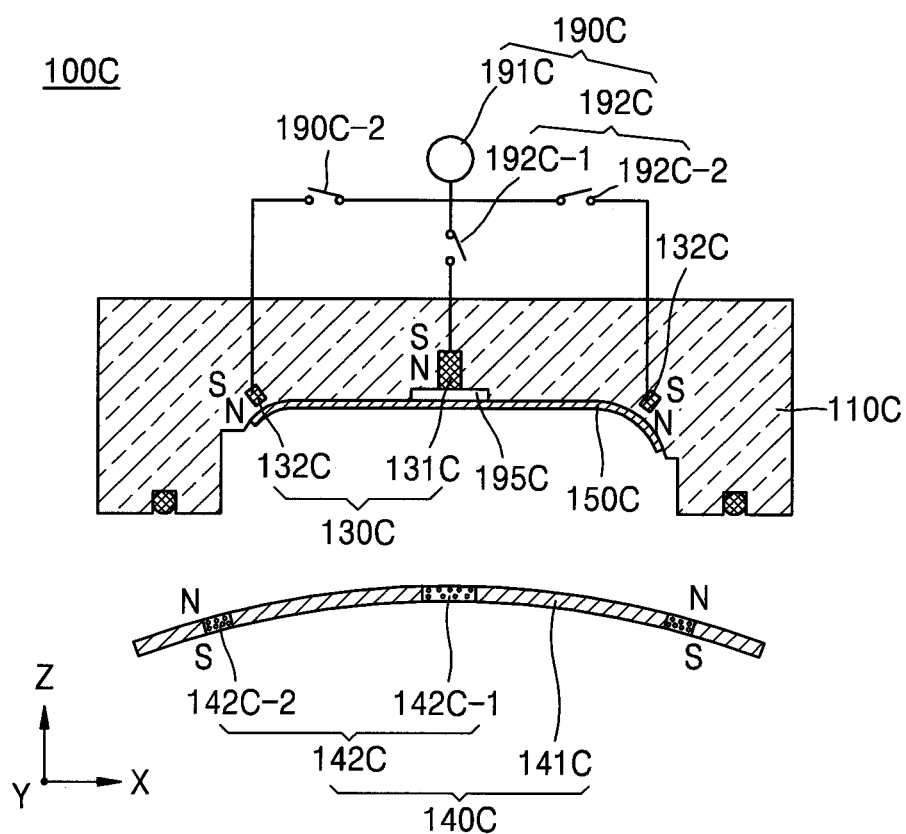
FIG. 5 is a cross-sectional view of a first mold, a first guide unit, a shape-variable unit, and a sensor unit of an apparatus for manufacturing a display apparatus according to a fourth embodiment.

FIG. 5 is a cross-sectional view of a first mold, a first guide unit, a shape-variable unit, and a sensor unit of an apparatus for manufacturing a display apparatus according to a fourth embodiment.

Referring to FIG. 5, an apparatus 100C for manufacturing a display apparatus may include a first mold 110C, a second mold, a first guide unit 130C, a shape-variable unit 140C, a cover member fixing unit 150C, a pressure adjusting unit, a sucking unit, and a mold driving unit. The first mold 110C, the second mold, the cover member fixing unit 150C, the pressure adjusting unit, the sucking unit, and the mold driving unit are substantially the same as those described above with reference to FIGS. 1 and 2 and, thus, may not be described again in detail here.

The first guide unit 130C may include a first sub-guide unit 131C and a second sub-guide unit 132C. The first sub-guide unit 131C and the second sub-guide unit 132C may each include an electromagnet.

The second sub-guide unit 132C may be provided on a portion of the first mold 110C on which a curved portion of the cover member 10 is placed. In this embodiment, the second sub-guide unit 132C may be provided at a center of the curved portion of the cover member 10.

The shape-variable unit 140C may include a shape-variable body portion 141C and a second guide unit 142C.

The shape-variable body portion 141C is substantially the same as that described above and, thus, may not be described again in detail here.

The second guide unit 142C may include a third sub-guide unit 142C-1 and a fourth sub-guide unit 142C-2 located in gaps within the shape-variable body portion 141C to be connected to the shape-variable body portion 141C. In this embodiment, the third sub-guide unit 142C-1 may include a magnetic substance, and the fourth sub-guide unit 142C-2 may include a permanent magnet.

The apparatus 100C for manufacturing a display apparatus may further include a sensor unit 195C (e.g., a sensor) and a power supply unit 190C (e.g., a power supply). The sensor unit 195C may sense a distance between the panel member 20 and the cover member 10, whether or not the panel member 20 and the cover member 10 are adhered to each other, and/or the position of the panel member 20. The sensor unit 195C may be any of various, suitable types of sensor such as, a photo sensor, a laser sensor, a contact sensor, etc.

The sensor unit 195C may be arranged to correspond to a portion of the panel member 20 which is to be first adhered to the cover member 10. In this embodiment, the sensor unit 195C may be provided on the first mold 110C to correspond to a central portion of the first mold 110C and a flat portion of the cover member 10.

The power supply unit 190C may include a power source unit 191C (e.g., a power source) for supplying electric current to the first sub-guide unit 131C and the second sub-guide unit 132C, and a switch unit 192C (e.g., a switch) for blocking supply of electric current between the first sub-guide unit 131C and the power source unit 191C and between the second sub-guide unit 132C and the power source unit. In this embodiment, the switch unit 192C may include a first switch unit 192C-1 (e.g., a first switch) for blocking or supplying electric current between the first sub-guide unit 131C and the power source unit 191C and a second switch unit 192C-2 (e.g., a second switch) for blocking or supplying electric current between the second sub-guide unit 132C and the power source unit 191C.

An operation of the apparatus 100C for manufacturing a display apparatus will now be described. As described above, after the cover member 10 and the panel member 20 are arranged, the shape-variable unit 140C may be expanded using the pressure adjusting unit.

When the shape-variable unit 140C expands as described above, the first switch unit 192C-1 may connect the power source unit 191C and the first sub-guide unit 131C to each other. In this embodiment, the first sub-guide unit 131C may have a polarity that is the opposite of, and thus attracts, the third sub-guide unit 142C-1.

The second switch unit 192C-2 may connect the second sub-guide unit 132C and the power source unit 191C to each other to operate the second sub-guide unit 132C. In this embodiment, a surface of the second sub-guide unit 132C and a surface of the fourth sub-guide unit 142C-2 that face each other have identical polarities and, thus, a repulsive force may be generated between the second sub-guide unit 132C and the fourth sub-guide unit 142C-2.

When the first sub-guide unit 131C and the second sub-guide unit 132C are operated as described above, the cover member 10 and the panel member 20 may be first adhered to each other at a location at where the first sub-guide unit 131C is provided. In this embodiment, the sensor unit 195C may sense whether or not the cover member 10 and the panel member 20 start to be adhered to each other.

When the sensor unit 195C senses that the cover member 10 and the panel member 20 are in contact with each other (e.g., linear contact with each other in a Y-axis direction of FIG. 5), the first switch unit 192C-1 and the second switch unit 192C-2 may be operated to block supply of electric current from the power source unit 191C to the first guide unit 130C. In this embodiment, when the pressure adjusting unit is operated, the shape-variable unit 140C expands (e.g., continuously expands) to sequentially adhere the panel member 20 to the cover member 10 outwardly from the flat portion of the cover member 10 to both ends of the cover member 10.

During the process, only the second switch unit 192C-2 may be operated to operate the second sub-guide unit 132C. In this embodiment, a polarity of the second sub-guide unit 132C may be different from that of the fourth sub-guide unit 142C-2 facing the second sub-guide unit 132O, thereby generating an attractive force between the second sub-guide unit 132C and the fourth sub-guide unit 142C-2.

The attractive force generated between the second sub-guide unit 132C and the fourth sub-guide unit 142C-2 and a pressure applied from the shape-variable unit 140C work together at a curved portion of the cover member 10 to firmly adhere the cover member 10 and the panel member 20 to each other.

Thus, the apparatus 100C for manufacturing a display apparatus is capable of precisely and rapidly adhering the cover member 10 and the panel member 20 to each other.

Also, the apparatus 100C for manufacturing a display apparatus and a method of manufacturing a display apparatus are capable of preventing or reducing the occurrence of air bubbles, foreign substances, etc. being stuck between the cover member 10 and the panel member 20, thereby reducing or minimizing an error rate.

The apparatus 100C for manufacturing a display apparatus and the method of manufacturing a display apparatus are capable of sequentially adhering the panel member 20 from a flat portion of the cover member 10 to a curved portion of the cover member 10, thereby firmly adhering the panel member 20 to the cover member 10.

Figure 6:
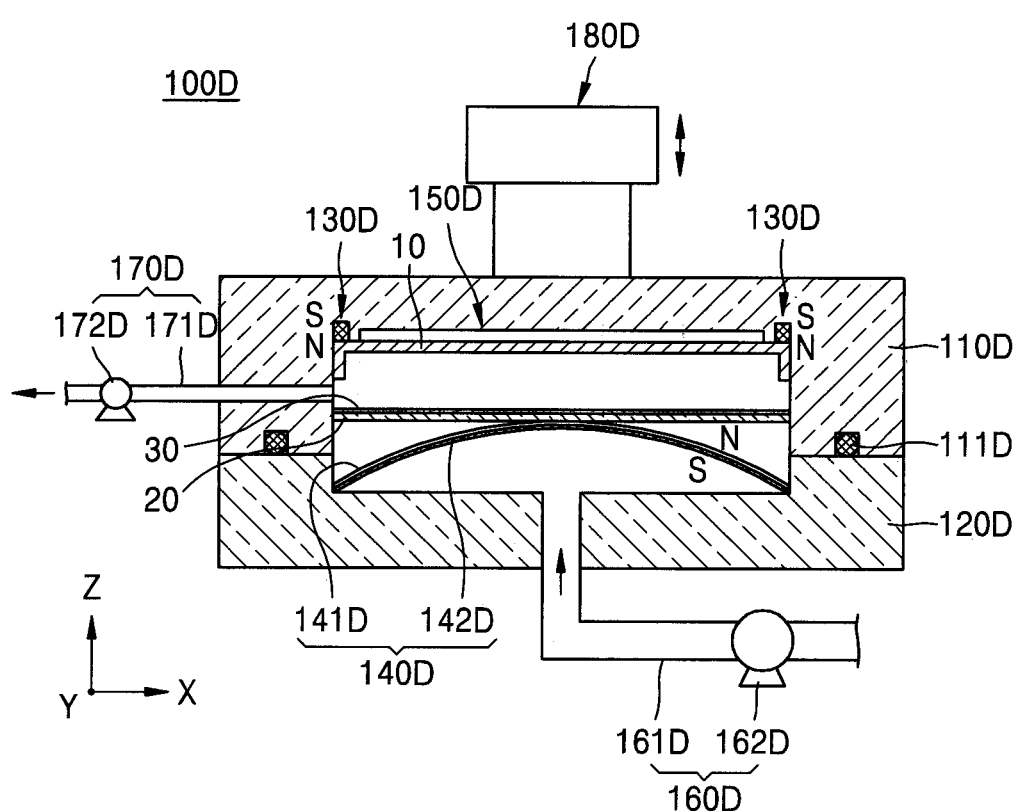
FIG. 6 is a cross-sectional view of an apparatus for manufacturing a display apparatus according to a fifth embodiment.

FIG. 6 is a cross-sectional view of an apparatus for manufacturing a display apparatus according to a fifth embodiment.

Referring to FIG. 6, an apparatus 100D for manufacturing a display apparatus may include a first mold 110D, a second mold 120D, a first guide unit 130D, a shape-variable unit 140D, a cover member fixing unit 150D, a pressure adjusting unit 160D, a sucking unit 170D, and a mold driving unit 180D.

At least a portion of the first mold 110D may be formed to be bent or curved. For convenience of explanation, an embodiment in which at least a portion of the first mold 110D is bent will be described in further detail below. The second mold 120D is substantially the same as that described above with reference to FIGS. 1 and 2 and, thus, may not be described again in detail here. A sealing unit 111D may be provided between the first mold 110D and the second mold 120D as described above and, thus, may not be described again in detail here.

A plurality of first guide units 130D may be provided. In this embodiment, the plurality of first guide units 130D may be respectively provided on bent portions of the first mold 110D. For convenience of explanation, an embodiment in which two first guide units 130D are provided will be described in further detail below.

The shape-variable unit 140D may include a shape-variable body portion 141D and a second guide unit 142D.

In this embodiment, the shape-variable body portion 141D may include a ductile material, such as silicon, rubber, etc. The second guide unit 142D may include a magnetic substance or a magnet. For convenience of explanation, an embodiment in which second guide unit 142D includes a permanent magnet will be described in further detail below.

The shape-variable body portion 141D and the second guide unit 142D may be stacked together. In this embodiment, the second guide unit 142D may be provided on an entire surface of (e.g., an entire lower surface of) the shape-variable body portion 141D or may be provided only on a portion of the shape-variable body portion 141D. For convenience of explanation, an embodiment in which the second guide unit 142D is provided on the entire surface of the shape-variable body portion 141D will be described in further detail below.

The cover member fixing unit 150D may be formed in various shapes and may include various components as described above with reference to FIGS. 1 and 2. For convenience of explanation, an embodiment in which the cover member fixing unit 150D includes an electrostatic chuck will be described in further detail below.

The pressure adjusting unit 160D may include a supply channel 161D and a pressure adjusting pump 162D. The sucking unit 170D may include a second guide channel 171D and a second pump 172D. The pressure adjusting unit 160D and the sucking unit 170D are substantially the same as those described above and, thus, may not be described, again in detail here.

The mold driving unit 180D may be formed to be substantially the same as that described above with reference to FIGS. 1 and 2. For convenience of explanation, an embodiment in which the mold driving unit 180D includes a cylinder connected to the first mold 110D will be described in further detail below.

An operation of the apparatus 100D for manufacturing a display apparatus will now be described. The panel member 20 and the cover member 10 may be arranged between the first mold 110D and the second mold 120D in a state in which the first mold 110D and the second mold 120D are spaced from (e.g., separated from) each other.

After the mold driving unit 180D is operated to combine the first mold 110D and the second mold 120D with each other, the pressure adjusting pump 162D may be operated to expand the shape-variable unit 140D. In this embodiment, the second guide unit 142D may also expand to come close to the first guide unit 130D. Because a surface of the first guide unit 130D and a surface of the second guide unit 142D that face each other have identical polarities, a repulsive force may be generated therebetween.

As the shape-variable unit 140D continuously expands, a portion of the panel member 20 at where the first guide unit 130D and the second guide unit 142D face each other is hardly moved while a central apportion of the panel member 20 continuously expands to be adhered to the cover member 10. When a certain time elapses, a portion of the panel member 20 on which the shape-variable unit 140D is located may be adhered to the cover member 10 due to the expansion of the second guide unit 142D. In this embodiment, the second pump 172D may be operated to discharge gas between the panel member 20 and the cover member 10 to outside the first and second molds 110D and 120D.

Then, when the panel member 20 is completely adhered to the cover member 10 due to the continuous expansion of the shape-variable unit 140D, the mold driving unit 180D may be operated to separate the first mold 110D and the second mold 120D from each other. A display apparatus may be unloaded to the outside from between the first mold 110D and the second mold 120D, which are separated from each other.

Thus, the apparatus 100D for manufacturing a display apparatus may precisely and rapidly adhere the cover member 10 and the panel member 20 to each other.

Also, the apparatus 100D for manufacturing a display apparatus and a method of manufacturing a display apparatus may prevent or reduce the occurrence of air bubbles, foreign substances, etc. being stuck between the cover member 10 and the panel member 20, thereby reducing or minimizing an error rate.

The apparatus 100D for manufacturing a display apparatus and the method of manufacturing a display apparatus are capable of sequentially adhering the panel member 20 to the cover member 10 from a flat portion thereof outwardly to a curved portion thereof, thereby firmly adhering the panel member 20 to the cover member 10.

Figure 7:
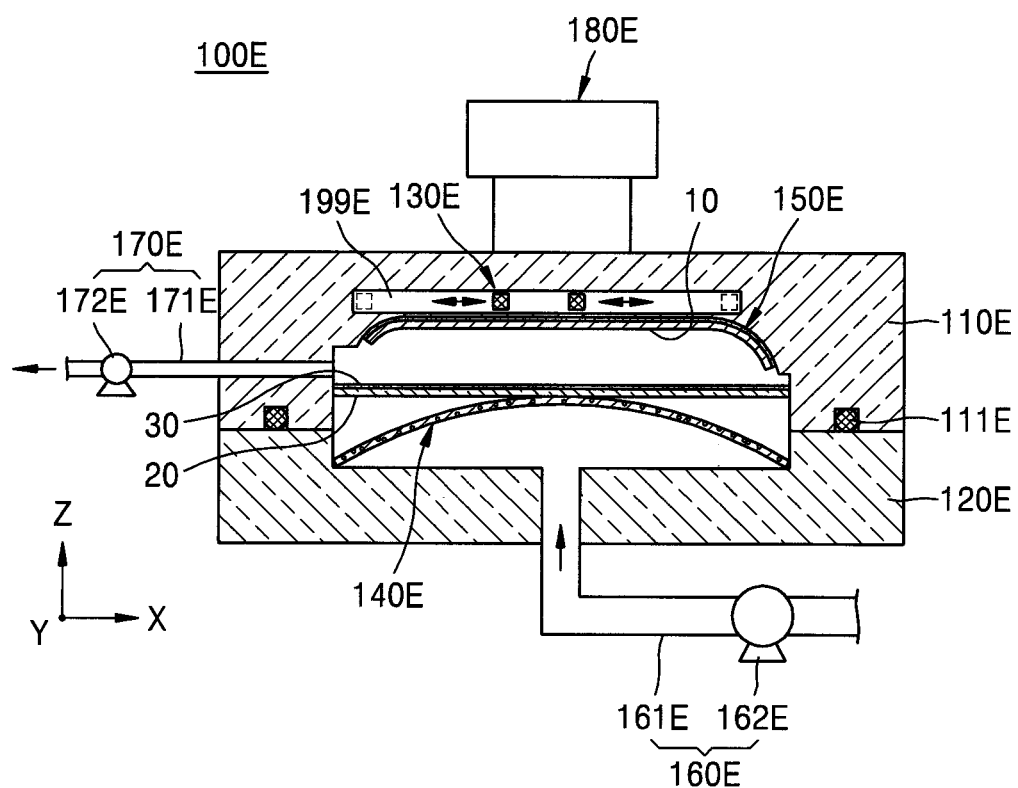
FIG. 7 is a cross-sectional view of an apparatus for manufacturing a display apparatus according to a sixth embodiment.

FIG. 7 is a cross-sectional view of an apparatus for manufacturing a display apparatus according to a sixth embodiment.

Referring to FIG. 7, an apparatus 100E for manufacturing a display apparatus may include a first mold 110E, a second mold 120E, a first guide unit 130E, a path guide unit 199E (e.g., a path or a path guide), a shape-variable unit 140E, a cover member fixing unit 150E, a pressure adjusting unit 160E, a sucking unit 170E, and a mold driving unit 180E.

A cover member 10, at least a portion of which is curved or bent, may be placed on the first mold 110E. The first mold 110E is substantially the same as that described above and, thus, may not be described again in detail here.

The shape-variable unit 140E may be provided on or in the second mold 120E. The second mold 120E is substantially the same as that described above and, thus, may not be described again in detail here. For convenience of explanation, an embodiment in which a sealing unit 111E is provided on the first mold 110E will be described in further detail below.

The first guide unit 130E may include a magnet or a magnetic substance. For convenience of explanation, an embodiment in which the first guide unit 130E includes a magnet will be described in further detail below.

The path guide unit 199E may provide and/or guide a path of the first guide unit 130E. In this embodiment, the path guide unit 199E may be formed to be parallel to at least one surface (e.g., a flat surface) of the cover member 10. For example, the path guide unit 199E may guide the first guide unit 130E to move along (e.g., move parallel to) the one surface of the cover member 10.

The path guide unit 199E may be formed to have various shapes and may include various components. For example, the path guide unit 199E may include rails along which the first guide unit 130E may move and a driving unit for moving the first guide unit 130E along the rails. According to another embodiment, the path guide unit 199E may include a linear motor on which the first guide unit 130E is provided. According to another embodiment, the path guide unit 199E may include a ball screw on which the first guide unit 130E is provided and a motor for operating the ball screw. The path guide unit 199E is, however, not limited to these examples and may include various devices and structures for moving the first guide unit 130E along at least a portion of the one surface of the cover member 10.

The shape-variable unit 140E may include a magnet or a magnetic substance that responds to movement of the first guide unit 130E (e.g., that is attracted to or repulsed from the first guide unit 130E). In this embodiment, the shape-variable unit 140E may be formed to be substantially the same as that described above with reference to FIG. 2 or 6. For convenience of explanation, an embodiment in which the shape-variable unit 140E includes a magnetic substance therein that is substantially the same as that described above with reference to FIG. 2 will be described in further detail below.

The cover member fixing unit 150E may be formed to be substantially the same as that described above. For convenience of explanation, an embodiment in which the cover member fixing unit 150E includes a physical sticky chuck will be described in further detail below.

The pressure adjusting unit 160E may include a supply channel 161E and a pressure adjusting pump 162E. The sucking unit 170E may include a second sucking channel 171E and a second pressure adjusting pump 172E. The pressure adjusting unit 160E and the sucking unit 170E are substantially the same as those described above and, thus, may not be described again in detail here.

The mold driving unit 180E may be formed in various shapes and may include various components as described above. For convenience of explanation, an embodiment in which the mold driving unit 180E includes a cylinder will be described in further detail below.

An operation of the apparatus 100E for manufacturing a display apparatus will now be described. The cover member 10, the panel member 20, and the adhesive member 30 may be arranged in a space between the first mold 110E and the second mold 120E in a state in which the first mold 110E and the second mold 120E are open or separated from each other.

Then, the second pressure adjusting pump 172E may be operated to expand the shape-variable unit 140E in a state in which a space between the first mold 110E and the second mold 120E is blocked and sealed by completely combining the first mold 110E and the second mold 120E with each other by using the mold driving unit 180E. Also, the second pressure adjusting pump 172E may be operated to discharge gas between the panel member 20 and the cover member 10.

During the above-described process, the first guide unit 130E may be located at or above a portion of the cover member 10. In this embodiment, a portion of the shape-variable unit 140E may be moved toward the first guide unit 130E (e.g., may be attracted to the first guide unit 130E). Thus, a portion of the cover member 10 and the panel member 20 may be adhered to each other. For example, a flat portion (e.g., a central portion) of the cover member 10 may be first adhered to the panel member 20.

When the second pressure adjusting pump 172E is continuously operated, the shape-variable unit 140E may be further expanded. In this embodiment, the path guide unit 199E may move the first guide unit 130E from the flat portion of the cover member 10 to an end or edge of the cover member 10.

In this embodiment, a plurality of first guide units 130E may be provided. For example, two first guide units 130E facing each other may be provided and may move in opposite directions.

When the first guide units 130E are moved, the panel member 20 may be sequentially adhered from a flat portion (e.g., a central portion) of the cover member 10 outwardly to both ends thereof. For example, the shape-variable unit 140E may guide the panel member 20 to move along the path described above according to the movement of the first guide units 130E.

When a display apparatus is manufactured according to the above-described process, the mold driving unit 180E may be operated to separate the first mold 110E and the second mold 120E from each other and to allow the display apparatus to be unloaded to the outside.

Thus, the apparatus 100E for manufacturing a display apparatus is capable of precisely and rapidly adhering the cover member 10 and the panel member 20 to each other.

The apparatus 100E for manufacturing a display apparatus and a method of manufacturing a display apparatus are capable of preventing or reducing the occurrence of air bubbles, foreign substances, etc. being stuck between the cover member 10 and the panel member 20, thereby reducing or minimizing an error rate.

The apparatus 100E for manufacturing a display apparatus and the method of manufacturing a display apparatus are capable of sequentially adhering the panel member 20 from a flat portion of the cover member 10 outwardly to a curved portion thereof, thereby firmly adhering the panel member 20 to the cover member 10.

Figure 8:
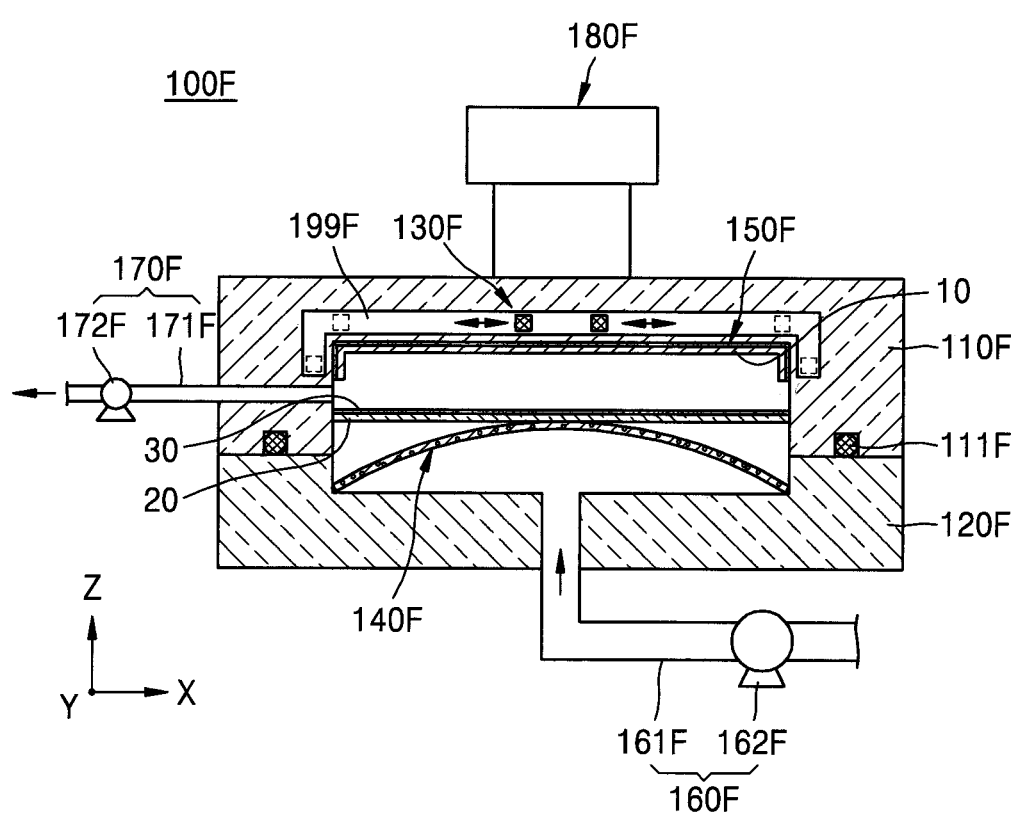
FIG. 8 is a cross-sectional view of an apparatus for manufacturing a display apparatus according to a seventh embodiment.

FIG. 8 is a cross-sectional view of an apparatus for manufacturing a display apparatus according to a seventh embodiment.

Referring to FIG. 8, an apparatus 100F for manufacturing a display apparatus includes a first mold 110F, a second mold 120F, a first guide unit 130F, a path guide unit 199F, a shape-variable unit 140F, a cover member fixing unit 150F, a pressure adjusting unit 160F, a sucking unit 170F, and a mold driving unit 180F. The first mold 110F, the second mold 120F, the first guide unit 130F, the shape-variable unit 140F, the cover member fixing unit 150F, the pressure adjusting unit 160F, the sucking unit 170F, and the mold driving unit 180F are substantially the same as those described above with reference to FIG. 7 and, thus, may not be described again in detail here.

The path guide unit 199F may have the same or substantially the same shape as that of one surface of a cover member 10. For example, when the cover member 10 has a flat shape, the path guide unit 199F may be formed in a flat and straight line. According to another embodiment, when a portion of the cover member 10 is bent, a portion of the path guide unit 199F may be also bent. According to another embodiment, when a portion of the cover member 10 is curved, a portion of the path guide unit 199F may be also curved.

The path guide unit 199F may be formed in various shapes and may include various components as described above. For convenience of explanation, an embodiment in which the path guide unit 199F includes a linear motor will be described in further detail below.

An operation of the apparatus 100F for manufacturing a display apparatus will now be described. After the cover member 10, a panel member 20, and an adhesive member 30 are arranged between the first mold 110F and the second mold 120F, a pressure adjusting pump 162F may be operated to supply gas or liquid between the second mold 120F and the shape-variable unit 140F via a supply channel 161F.

The shape-variable unit 140F may expand to move the panel member 20 and the adhesive member 30 toward the cover member 10. When the shape-variable unit 140F expands to a certain volume or greater, a portion of the shape-variable unit 140F may be guided toward the first guide unit 130F.

As the shape-variable unit 140F expands, the cover member 10 and the panel member 20 may be first adhered to each other at a position at where the first guide unit 130F is located.

As described above, the first guide unit 130F may move along the path guide unit 199F according to the expansion of the shape-variable unit 140F. In this embodiment, the first guide unit 130F may move sequentially from a flat or central portion of the cover member 10 outwardly to an end or edge of the cover member 10. For example, the first guide unit 130F may pass a bent portion of the cover member 10 and may then move to the end of the cover member 10.

When the first guide unit 130F moves as described above, the panel member 20 may be adhered to the cover member 10 by a force generated when the shape-variable unit 140F expands and by a force between the first guide unit 130F and the shape-variable unit 140F guided by the movement of the first guide unit 130F. In this embodiment, the second sucking pump 172F may discharge (e.g., continuously discharge) gas from inside the second sucking channel 171F to the outside.

When a display apparatus is manufactured according to the above process, the mold driving unit 180F may open the first mold 110F and the second mold 120F to unload the manufactured the display apparatus to the outside.

Thus, the apparatus 100F for manufacturing a display apparatus may precisely and rapidly adhere the cover member 10 and the panel member 20 to each other.

Also, the apparatus 100F for manufacturing a display apparatus and a method of manufacturing a display apparatus may reduce or prevent the occurrence of air bubbles, foreign substances etc. being stuck between the cover member 10 and the panel member 20, thereby reducing or minimizing an error rate.

The apparatus 100F for manufacturing a display apparatus and the method of manufacturing a display apparatus are capable of sequentially adhering the panel member 20 from a flat portion of the cover member 10 outwardly to a curved portion thereof, thereby firmly adhering the panel member 20 to the cover member 10.

Figure 9:
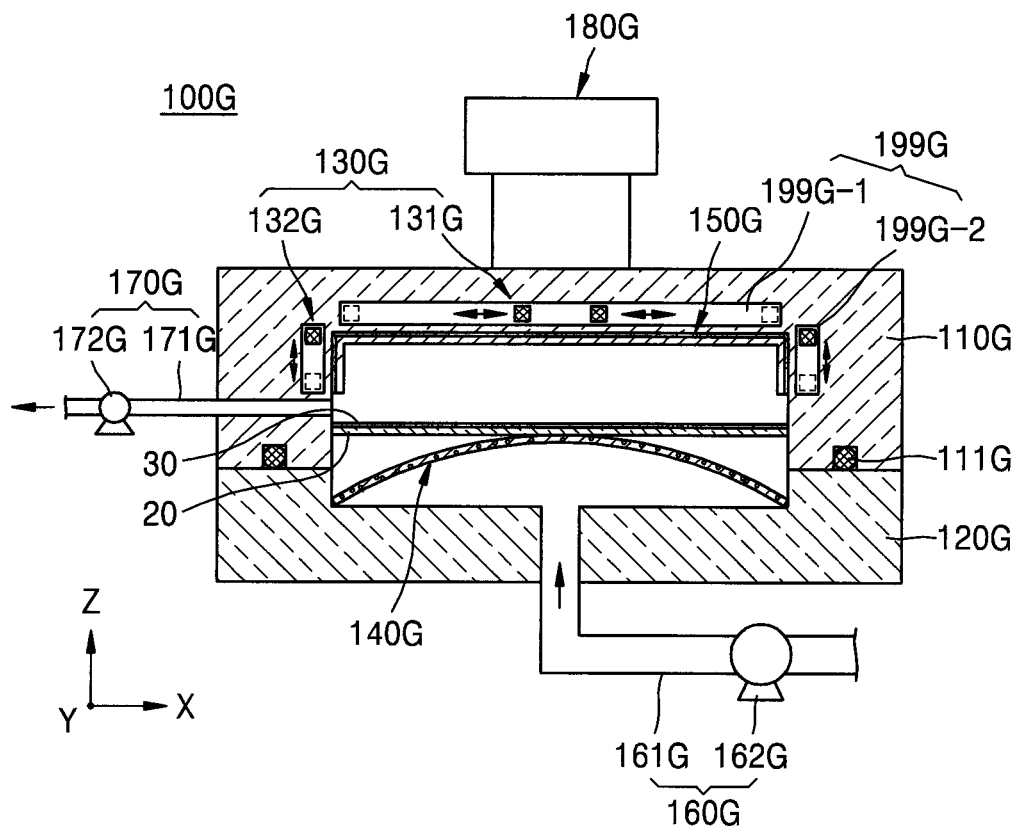
FIG. 9 is a cross-sectional view of an apparatus for manufacturing a display apparatus according to an eighth embodiment.

FIG. 9 is a cross-sectional view of an apparatus for manufacturing a display apparatus according to an eighth embodiment.

Referring to FIG. 9, an apparatus 100G for manufacturing a display apparatus may include a first mold 110G, a second mold 120G, a first guide unit 130G, a path guide unit 199G, a shape-variable unit 140G, a cover member fixing unit 150G, a pressure adjusting unit 160G, a sucking unit 170G, and a mold driving unit 180G. In this embodiment, the first mold 110G, the second mold 120G, the shape-variable unit 140G, the cover member fixing unit 150G, the pressure adjusting unit 160G, the sucking unit 170G, and the mold driving unit 180G are substantially the same as those described above with reference to FIG. 7 and, thus, may not be described again in detail here.

The first guide unit 130G may include a first sub-guide unit 131G and a second sub-guide unit 132G. In this embodiment, the first sub-guide unit 131G and the second sub-guide unit 132G may be provided at different locations adjacent a cover member 10. For example, when a portion of the cover member 10 is bent, the first sub-guide unit 131G may be provided on one portion (e.g., a central portion) of the cover member 10 and the second sub-guide unit 132G may be provided on another portion of the cover member 10 which is bent from the one portion of the cover member 10. According to another embodiment, when a portion of the cover member 10 is curved, the first sub-guide unit 131G may be provided on one portion of the cover member 10 and the second sub-guide unit 132G may be provided on another portion of the cover member 10 which is curvedly connected to the one portion of the cover member 10.

The first sub-guide unit 131G and the second sub-guide unit 132G may each include an electromagnet. In this embodiment, operations of the first sub-guide unit 131G and the second sub-guide unit 132G may be stopped or started according to an electric current being supplied thereto.

The path guide unit 199G may include a first path guide unit 199G-1 along which the first sub-guide unit 131G is movable and a second path guide unit 199G-2 along which the second sub-guide unit 132G is movable. The first path guide unit 199G-1 and the second path guide unit 199G-2 may be spaced a certain distance from one surface (e.g., an upper surface) of the cover member 10. For example, each of the first path guide unit 199G-1 and the second path guide unit 199G-2 may be arranged in parallel with different portions of one surface of the cover member 10.

An operation of the apparatus 100G for manufacturing a display apparatus will now be described. First, as the mold driving unit 180G is operated, the first mold 110G and the second mold 120G may be opened, and then, the cover member 10, a panel member 20, and an adhesive member 30 may be arranged in a space between the first mold 110G and the second mold 120G.

When the mold driving unit 180G combines the first mold 110G and the second mold with each other, a pressure adjusting pump 162G may be operated to supply gas or liquid between the second mold 120G and the shape-variable unit 140G via a supply channel 161G.

The shape-variable unit 140G may expand as the pressure adjusting pump 162G is operated. In this embodiment, the panel member 20 and the adhesive member 30 may come close to (e.g., may move towards) the cover member 10 as the shape-variable unit 140G expands.

During the above process, a second sucking pump 172G may discharge gas to the outside via a second sucking channel 171G. Also, an electric current may be supplied to the first sub-guide unit 131G and, thus, a magnetic field may be generated by the first sub-guide unit 131G. The supply of the electric current to the second sub-guide unit 132G may be disconnected and, thus, the second sub-guide unit 132G may not operate (e.g., may not move).

In this embodiment, the cover member 10 and the panel member 20 may be first adhered to each other at a position at where the first sub-guide unit 131G is located. While the shape-variable unit 140G expands (e.g., continuously expands), the first path guide unit 199G-1 may move the first sub-guide unit 131G from a central portion of the cover member 10 outwardly to a bent portion of the cover member 10.

Then, as the first sub-guide unit 131G is moved as described above, the panel member 20 may be sequentially adhered to portions of the cover member 10 along a moving path of the first sub-guide unit 131G.

Thereafter, as the shape-variable unit 140G continuously expands, the supply of the electric current to the first sub-guide unit 131G may be discontinued and electric current may be supplied to the second sub-guide unit 132G. Thus, the second sub-guide unit 132G may be operated to move the shape-variable unit 140G toward the second sub-guide unit 132G.

The second path guide unit 199G-2 may cause the second sub-guide unit 132G to be moved from the bent portion of the cover member 10 to an end of the cover member 10. In this embodiment, the cover member 10 and the panel member 20 may be adhered to each other according to a moving path of the second sub-guide unit 132G.

After a display apparatus is manufactured by combining the panel member 20 to the cover member 10, the first mold 110G and the second mold 120G may be opened to unload the display apparatus to the outside.

Thus, the apparatus 100G for manufacturing a display apparatus is capable of precisely and rapidly adhering the cover member 10 and the panel member 20 to each other.

Also, the apparatus 100G for manufacturing a display apparatus and a method of manufacturing a display apparatus are capable of reducing or preventing the occurrence of air bubbles, foreign substances, etc. being stuck between the cover member 10 and the panel member 20, thereby reducing or minimizing an error rate.

The apparatus 100G for manufacturing a display apparatus and the method of manufacturing a display apparatus are capable of sequentially adhering the panel member 20 from a flat portion of the cover member 10 to a curved portion thereof, thereby firmly adhering the panel member 20 to the cover member 10.

Figure 10:
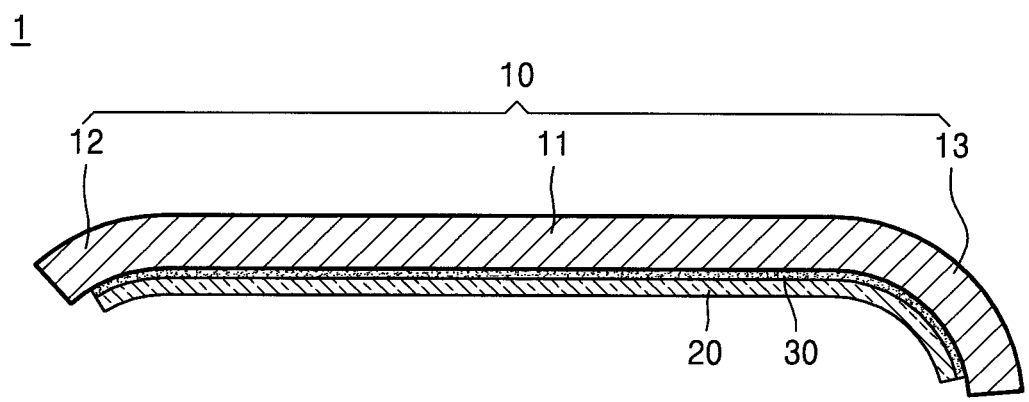
FIG. 10 is a cross-sectional view of a display apparatus manufactured using the apparatus illustrated in FIG. 1.
Figure 11:
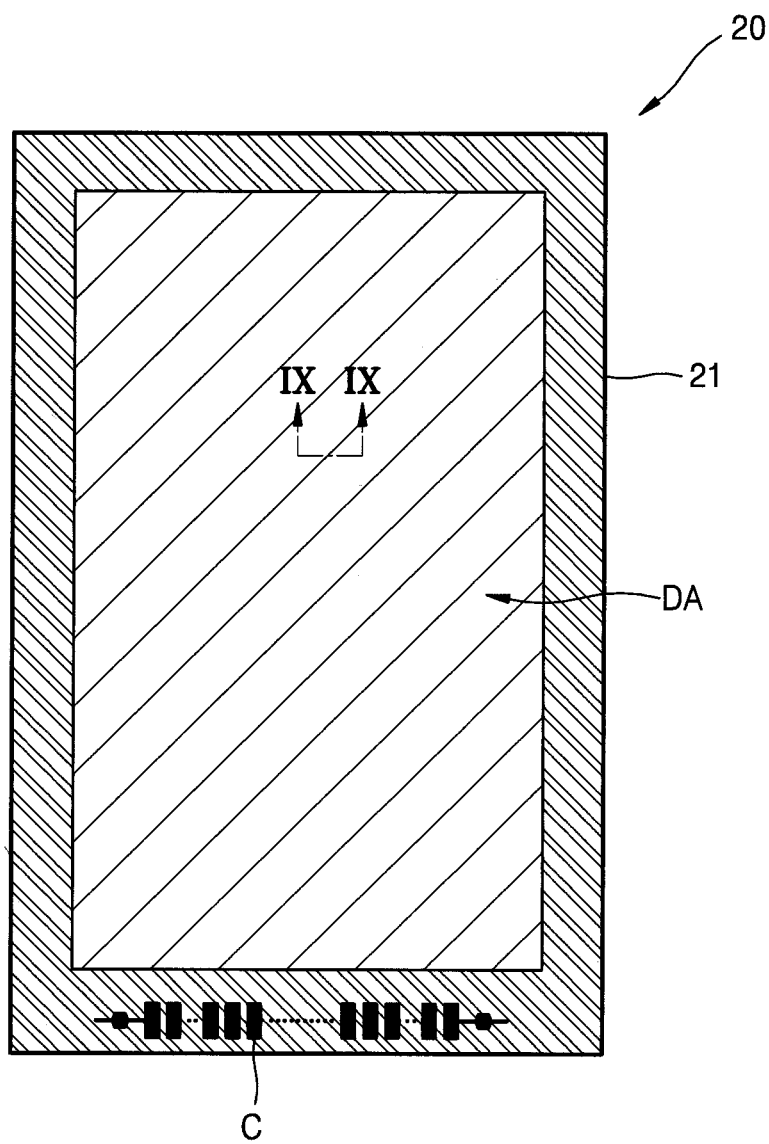
FIG. 11 is a plan view of a portion of a display panel illustrated in FIG. 10.
Figure 12:
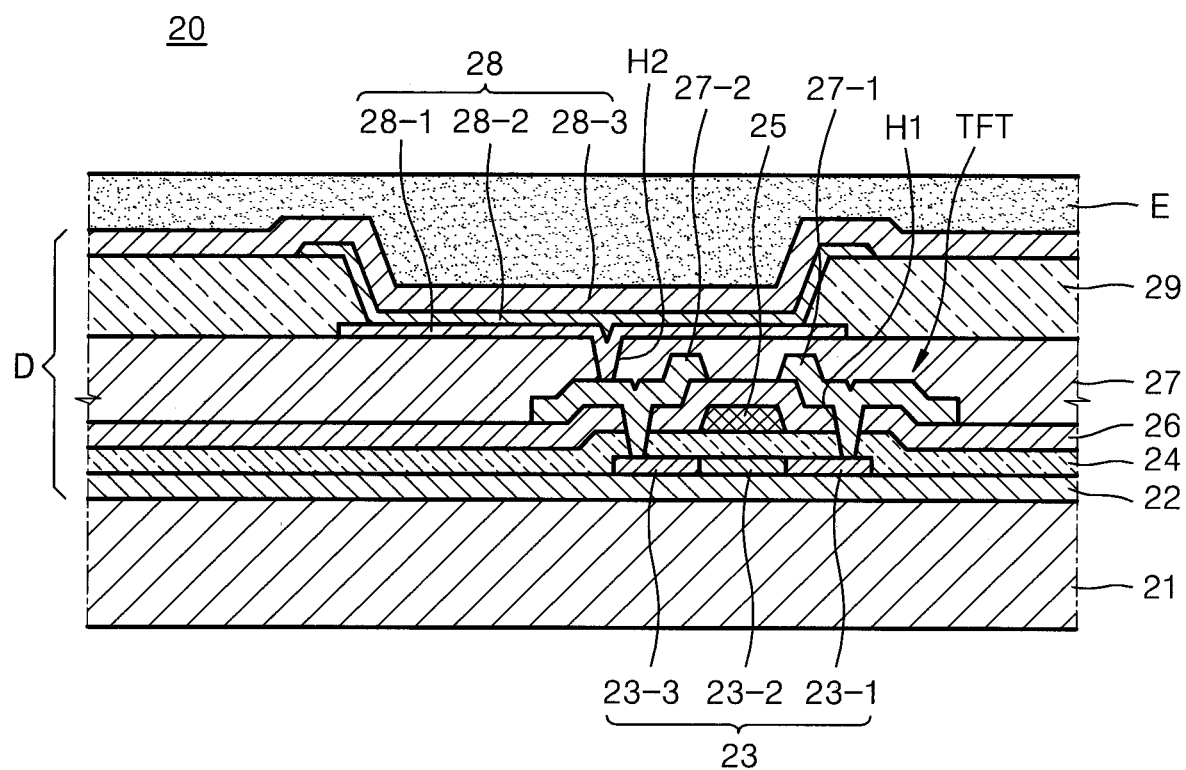
FIG. 12 is a cross-sectional view taken along the line A-A of FIG. 11.

FIG. 10 is a cross-sectional view of a display apparatus 1 manufactured using the apparatus 100 illustrated in FIG. 1. FIG. 11 is a plan view of a portion of a display panel illustrated in FIG. 10. FIG. 12 is a cross-sectional view taken along the line A-A of FIG. 11.

Referring to FIGS. 10 and 12, the display apparatus 1 may include a cover member 10, an adhesive member 30, and a panel member 20.

At least a portion of the cover member 10 may be curved. In this embodiment, the cover member 10 may include any of various, suitable materials having a light transmitting property. For example, the cover member 10 may include an acryl or a plastic material. According to another embodiment, the cover member 10 may include a glass material. The cover member 10 may be provided in the form of a plurality of layers formed of one or more transparent materials. For convenience of explanation, an embodiment in which the cover member 10 includes a glass material will be described in further detail below.

The cover member 10 may include a flat first cover member 11 (e.g., a flat portion) and a second cover member 12 and a third cover member 13 (e.g., second and third portions) each extending from the first cover member 11. In this embodiment, the second cover member 12 and the third cover member 13 may each have a curved surface having a radius of curvature (e.g., a certain radius of curvature). The radius of curvature of the second cover member 12 may be the same as or different than the radius of curvature of the third cover member 13. For example, the radius of curvature of the third cover member 13 may be greater than that of the second cover member 12. For convenience of explanation, an embodiment in which the radius of curvature of the third cover member 13 is greater than that of the second cover member 12 will be described in further detail below.

The panel member 20 may include various devices and components. For example, the panel member 20 may include a display panel. According to another embodiment, the panel member 20 may include a touch screen panel (TSP). According to another embodiment, the panel member 20 may include a protective film to be attached to the cover member 10. The protective film may prevent a surface of the cover member 10 from being scratched and/or prevent a foreign substance or the like from being adsorbed onto or through the cover member 10. The panel member 20 is, however, not limited thereto and may include various, suitable types of flexible devices in the field of display that may be attached to the cover member 10. For convenience of explanation, an embodiment in which the panel member 20 includes the display panel will be described in further detail below.

The adhesive member 30 may be provided on at least one of the panel member 20 and the cover member 10. In this embodiment, the adhesive member 30 may be provided on a surface of the panel member 20 facing the cover member 10 or a surface of the cover member 10 facing the panel member 20.

The adhesive member 30 may contain an optical adhesive having adhesive strength. For example, the adhesive member 30 may include an optically clear adhesive (OCA).

In the panel member 20, a display region DA and a non-display region outside the display region DA may be defined on a substrate 21. A light-emitting unit D may be located on the display region DA. A power supply line and the like may be located on the non-display region. A pad region C may be also located on the non-display region.

The panel member 20 may include the substrate 21 and the light-emitting unit D. The panel member 20 may further include a thin-film encapsulation layer E formed on the light-emitting unit D. In this embodiment, the substrate 21 may include a plastic material or a metal material, such as stainless steel (SUS), titanium (Ti), or the like. Also, the substrate 21 may include polyimide (PI). For convenience of explanation, an embodiment in which the substrate 21 includes polyimide (PI) will be described in further detail below.

The light-emitting unit D may be formed on the substrate 21. In the light-emitting unit D, a thin-film transistor (TFT) is formed, a passivation film 27 is formed to cover the TFT, and an organic light-emitting diode (OLED) 28 may be formed on the passivation film 27.

The substrate 21 may include a glass material but is not limited thereto. The substrate 21 may include a plastic material or a metal material, such as stainless steel (SUS) or titanium (Ti). Also, the substrate 21 may include polyimide (PI). For convenience of explanation, an embodiment in which the substrate 21 includes a glass material will be described in further detail below.

A buffer layer 22 formed of an organic compound and/or an inorganic compound is further formed on the substrate 21. The buffer layer 22 may include $SiO_x$ ($x \geq 1$) or $SiN_x$ ($x \geq 1$).

An active layer 23 is provided in a certain pattern on the buffer layer 22 and is then covered by a gate insulating layer 24. The active layer 23 includes a source region 23-1 and a drain region 23-3 and further includes a channel region 23-2 between the source and drain regions 23-1 and 23-3.

The active layer 23 may contain various, suitable materials. For example, the active layer 23 may contain an inorganic semiconductor material, such as amorphous silicon or crystalline silicon. As another example, the active layer 23 may contain an oxide semiconductor. As another example, the active layer 23 may contain an organic semiconductor material. For convenience of explanation, an embodiment in which the active layer 23 includes amorphous silicon will be described in further detail below.

The active layer 23 may be formed by forming amorphous silicon on the buffer layer 22, crystallizing the amorphous silicon into a polycrystalline silicon film, and patterning the polycrystalline silicon film. The source region 23-1 and the drain region 23-3 of the active layer 23 are doped with impurities according to the type of the TFT, for example, a driving TFT, a switching TFT, etc.

A gate electrode 25 corresponding to the active layer 23 and an interlayer insulating layer 26 covering the gate electrode 25 are formed on a top surface of the gate insulating layer 24.

After a contact opening H1 (e.g., a contact hole) is formed in the interlayer insulating layer 26 and the gate insulating layer 24, a source electrode 27-1 and a drain electrode 27-2 are the formed on the interlayer insulating layer 26 to respectively contact the source region 23-1 and the drain region 23-2.

The passivation film 27 is formed on the TFT formed as described above. A pixel electrode 28-1 of the OLED 28 is formed on the passivation film 27. The pixel electrode 28-1 contacts the drain electrode 27-2 of the TFT via an opening H2 (e.g., a through-hole or via-hole) formed in the passivation film 27. The passivation film 27 may be a single layer structure or may be a structure including two or more layers formed of an inorganic material and/or an organic material. An upper film of the passivation film 27 may be formed as a planarization film regardless of whether or not a lower film thereof is bent or uneven so that the passivation film 27 has a flat top surface or may be bent or uneven according to the bending of the lower film (e.g., may have a surface that mirrors the surface of the lower film). The passivation film 27 may include a transparent insulating material to provide a resonance effect.

After the pixel electrode 28-1 is formed on the passivation film 27, a pixel defining film 29 is formed using an organic material and/or an inorganic material to cover the pixel electrode 28-1 and the passivation film 27, and an opening is provided in the pixel defining film 29 to expose the pixel electrode 28-1.

Then, an intermediate layer 28-2 and an opposite electrode 28-3 are formed at least on the pixel electrode 28-1.

The pixel electrode 28-1 may function as an anode electrode, and the opposite electrode 28-3 may function as a cathode electrode, or vice versa.

The pixel electrode 28-1 and the opposite electrode 28-3 are insulated from each other via the intermediate layer 28-2. When voltages having different polarities from each other are applied to the intermediate layer 28-2, light is emitted from an organic emission layer thereof.

The intermediate layer 28-2 may include the organic emission layer. In other embodiments, the intermediate layer 28-2 may include the organic emission layer and may further include a hole injection layer (HIL), a hole transport layer, an electron transport layer, and/or an electron injection layer. However, embodiments are not limited thereto, and the intermediate layer 28-2 may include the organic emission layer and may further include other various, suitable functional layers.

One unit pixel includes a plurality of sub-pixels that emit various colors. For example, the plurality of sub-pixels may include sub-pixels which respectively emit red, green, and blue lights or may include sub-pixels which respectively emit red, green, blue, and white lights.

The thin-film encapsulation layer E may include a plurality of inorganic layers or may include an inorganic layer and an organic layer.

The organic layer of the thin-film encapsulation layer E is a polymer and may be a single film or a stacked structure of films including polyethylene terephthalate, polyimide, polycarbonate, epoxy, polyethylene, and/or polyacrylate. The organic layer may include polyacrylate. For example, the organic layer or a portion thereof may be formed by polymerizing a monomer composite including a diacrylate-based monomer and a triacrylate-based monomer. The monomer composite may further include a monoacrylate-based monomer. The monomer composite may further include a photoinitiator, such as, trimethylbenzoyl diphenylphosphine oxide (TPO), but is not limited thereto.

The inorganic layer of the thin-film encapsulation layer E may be a single layer or a stacked structure of layers including a metal oxide and/or a metal nitride. For example, the inorganic layer may include $SiN_x$, $Al_2O_3$, $SiO_2$, or $TiO_2$.

An exposed uppermost layer of the thin-film encapsulation layer E may be an inorganic layer to protect the OLED 28 from moisture.

The thin-film encapsulation layer E may include a sandwich structure in which at least one organic layer is interposed between at least two inorganic layers. As another example, the thin-film encapsulation layer E may include a sandwich structure in which at least one inorganic layer is interposed between at least two organic layers. As another example, the thin-film encapsulation layer E may include a sandwich structure in which at least one organic layer is interposed between two inorganic layers and may include a sandwich structure in which at least one inorganic layer is interposed between two organic layers.

The thin-film encapsulation layer E may include a first inorganic layer, a first organic layer, and a second inorganic layer which are sequentially formed on the OLED 28.

As another example, the thin-film encapsulation layer E may include a first inorganic layer, a first organic layer, a second inorganic layer, a second organic layer, and a third inorganic layer which are sequentially formed on the OLED 28.

As another example, the thin-film encapsulation layer E may include a first inorganic layer, a first organic layer, a second inorganic layer, a second organic layer, a third inorganic layer, a third organic layer, and a fourth inorganic layer which are sequentially formed on the OLED 28.

A metal halide layer including LiF may be further included between the OLED 28 and the first inorganic layer. The metal halide layer may prevent the OLED 28 from being damaged when the first inorganic layer is formed by sputtering.

The first organic layer may have an area (e.g., a surface layer) less than that of the second inorganic layer. The second organic layer may have an area (e.g., a surface area) less than that of the third inorganic layer.

Thus, an image may be clearly displayed on the display apparatus 1 because a foreign substance, air bubbles, and the like are not present or are not present in a significant amount between the cover member 10 and the panel member 20. In the display apparatus 1, the panel member 20 may be closely adhered to a curved portion of the cover member 10. Thus, when the display apparatus 1 is used, the cover member 10 and the panel member 20 may not be separated from each other due to a restoring force of the panel member 20.

According to exemplary embodiments, an apparatus and method for manufacturing a display apparatus are capable of precisely and rapidly adhering a cover member and a panel member to each other.

According to exemplary embodiments, an apparatus and method for manufacturing a display apparatus are capable of reducing or preventing air bubbles, foreign substances, etc. from being formed or trapped between a cover member and a panel member, thereby reducing or minimizing an error rate.

According to embodiments, an apparatus and method for manufacturing a display apparatus are capable of sequentially adhering a panel member from a flat portion of a cover member outwardly to a curved portion thereof, thereby firmly adhering the panel member to the cover member.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method of manufacturing a display apparatus, the method comprising:
    placing a cover member on a first mold and placing a panel member on a shape-variable unit, the first mold comprising a first guide unit, the shape-variable unit comprising a second guide unit;
    changing a shape of the shape-variable unit to adhere a first portion of the panel member to the cover member before second portions of the panel member adhere to the cover member; and
    further changing the shape of the shape-variable unit to sequentially adhere the panel member to the cover member from the first portion of the panel member to the second portions of the panel member,
    wherein the cover member remains stationary as the panel member is adhered thereto, and
    wherein the first guide unit and the second guide unit are magnetically attracted to each other.

2. The method of claim 1, further comprising sensing a distance between the first portion of the panel member and the cover member.

3. The method of claim 1, wherein the changing of the shape of the shape-variable unit comprises removing air from between the cover member and the panel member, and
    wherein the further changing of the shape of the shape-variable unit comprises continually removing air from between the cover member and the panel member.

4. A method of manufacturing a display apparatus, the method comprising:
    placing a cover member on a first mold and placing a panel member on a shape-variable unit;
    changing a shape of the shape-variable unit to adhere a first portion of the panel member to the cover member before second portions of the panel member adhere to the cover member; and
    further changing the shape of the shape-variable unit to sequentially adhere the panel member to the cover member from the first portion of the panel member to the second portions of the panel member,
    wherein the first portion of the panel member is moved toward the cover member due to a magnetic force.

5. The method of claim 4, wherein an intensity of the magnetic force at the first portion of the panel member is different from an intensity of the magnetic force at the second portions of the panel member.

6. The method of claim 4, further comprising sensing a distance between the first portion of the panel member and the cover member.

7. A method of manufacturing a display apparatus, the method comprising:
    placing a cover member on a first mold and placing a panel member on a shape-variable unit;
    changing a shape of the shape-variable unit to adhere a first portion of the panel member to the cover member before second portions of the panel member adhere to the cover member; and
    further changing the shape of the shape-variable unit to sequentially adhere the panel member to the cover member from the first portion of the panel member to the second portions of the panel member, wherein the second portions of the panel member are restricted from moving toward the cover member due to a repulsive magnetic force.

8. The method of claim 7, further comprising sensing a distance between the first portion of the panel member and the cover member.

9. The method of claim 7, wherein an intensity of the magnetic force at the first portion of the panel member is different from an intensity of the magnetic force at the second portions of the panel member.

* * * * *